United States Patent [19]

Lippitt et al.

[11] 4,449,087

[45] May 15, 1984

[54] FLUX FEEDBACK FIRING CONTROL FOR A LOAD COMMUTATED INVERTER

[75] Inventors: David L. Lippitt, Schenectady, N.Y.; Paul M. Espelage, Salem, Va.; Leland C. Tupper, Schenectady, N.Y.; Loren H. Walker; Herbert W. Weiss, both of Salem, Va.

[73] Assignee: General Electric Company, Salem, Va.

[21] Appl. No.: 333,933

[22] Filed: Dec. 23, 1981

[51] Int. Cl.³ .................................... H02P 5/40
[52] U.S. Cl. .................................... 318/723; 318/721; 318/809
[58] Field of Search .................. 318/803, 807–811

[56] References Cited

U.S. PATENT DOCUMENTS

| | | | |
|---|---|---|---|
| 3,601,674 | 8/1971 | Joslyn et al. | 318/318 |
| 3,909,688 | 9/1975 | Blaschke et al. | 318/227 |
| 4,044,285 | 8/1977 | Plunkett et al. | 318/808 |
| 4,090,116 | 5/1978 | Lippitt | 318/345 E |
| 4,186,435 | 1/1980 | Cailloux | 318/722 |
| 4,201,936 | 5/1980 | Roumanis | 318/341 |
| 4,230,979 | 10/1980 | Espelage et al. | 318/721 |
| 4,263,557 | 4/1981 | Jarvinen | 318/341 |
| 4,264,853 | 4/1981 | Morishita | 318/723 |
| 4,276,505 | 6/1981 | Bose | 318/723 |

Primary Examiner—David Smith, Jr.
Attorney, Agent, or Firm—Arnold E. Renner; Ormand R. Austin

[57] ABSTRACT

A load commutated inverter synchronous motor drive system wherein a thyristor firing control of the inverter is determined by the amplitude of pesudo flux waveforms which are derived from the integral of the line voltages coupling the inverter to the motor being driven. A firing strategy is provided based on the premise that optimum thyristor firing in a load commutated inverter operating at a leading power factor occurs at a point just below the peak of the forthcoming pseudo flux waveform which point comprises an amount of volt-seconds necessary to effect current commutation plus a nominal safety margin. The determination and control is implemented, preferably, in a software phase lock loop but can, when desirable, be implemented in hardware.

30 Claims, 8 Drawing Figures

FLUX FEEDBACK FIRING CONTROL FOR A LOAD COMMUTATED INVERTER

REFERENCED MATERIAL

Reference is made to a microfiche appendix which sets forth a computer program listing including that which is applicable to the present invention. Included are 8 microfiche containing a total of 458 frames.

CROSS REFERENCE TO RELATED APPLICATION

This application is related to U.S. Ser. No. 300,200 entitled, "Line to Line Voltage Reconstruction For Synchronizing Thyristor Power Converter", filed on Sept. 8, 1981 in the names of Paul M. Espelage, et al. This application is assigned to the assignee of the present invention and is herein meant to be incorporated by reference

BACKGROUND OF THE INVENTION

The present invention relates generally to firing circuits for thyristor power conversion systems and more particularly to an improvement for controlling the commutation of a load commutated inverter which supplies a synchronous machine from a polyphase alternating current source.

Many circuits and systems are known for controlling the conductivity of controlled rectifiers utilized in various types of converters for supplying electrical power to a load such as an AC motor, from a polyphase alternating current (AC) source. The type of rectifier used will, of course, control to some degree the type of control utilized, but by far the most common control rectifier used today is a thyristor of the silicon controlled rectifier type which becomes conductive with the simultaneous application of a forward bias voltage and a signal applied to its gate electrode and which thereafter remains conductive until the anode current falls below the value required to hold the thyristor in the conductive state.

With respect to the load commutated inverter for a three phase (3φ) AC motor drive, control of the inverter supplying the synchronous motor is normally based upon a thyristor firing strategy of firing the thyristor as late as possible. To "fire as late as possible" is to render the thyristors conductive at the commutation limit point; i.e., at a power factor angle just sufficiently leading to provide the volt-seconds necessary to safely commutate the current from one thyristor to the other. It is to this aspect that the present invention is directed.

It should also be pointed out that whereas motor control systems employing thyristors have been implemented using analog control techniques, a typical example being U.S. No. 4,230,979, entitled, "Control Current Inverter And Motor Control System," Paul M. Espelage, et al., which issued on Oct. 28, 1980, attention has been and is presently being directed to digital type of control techniques, examples of which are disclosed in: U.S. Pat. No. 3,601,674, "Control System For Firing SCR's In Power Conversion Apparatus", John A. Joslyn, et al., which issued on Aug. 24, 1971; U.S. Pat. No. 4,263,557, "Power Converter Control", Willard B. Jarvinen, which issued on Apr. 21, 1981; and U.S. Pat. No. 4,276,505, "Microcomputer-Based Control Apparatus For a Load-Commutated Inverter Synchronous Machine Drive System", Bimal K. Bose, which issued on June 30, 1981. The teachings of these patents are also intended to be incorporated herein by reference.

In any phase control system, whether it be an analog or digital type system, the AC terminal voltage is a prime feedback signal employed for the thyristor bridge control. Typically, the AC terminal or phase voltages, referred to a fictitious neutral, are coupled from the high voltage thyristor bridge through a high impedance resistor attenuator string into differential amplifiers in the control circuitry and to other related circuitry to further derive various signals for a variety of purposes such as thyristor state detectors and voltage regulation. The principal use of the terminal voltage, however, is in a phase lock loop firing control circuit wherein synchronizing signals are generated from processed line voltages, typically involving integration of the AC line to line voltages. In such applications, the zero voltage commutation notches appearing in the line-to-line voltages generate flat spots in the integrated output voltage with the positioning of the notches being dependent upon the actual firing angle and the duration of the notches being dependent upon the line current and the inductive reactance in the commutation path. Typically, the zero crossings of the integrated line to line voltages are determined by comparators which are utilized to form a synchronizing pulse train at six times line frequency. Since the aforementioned flat spots can occur at the zero crossings, the stability of the phase lock loop can be undesirably affected. To overcome this deleterious effect, the above cross referenced application, U.S. Ser. No. 300,200 entitled, "Line to Line Voltage Reconstruction For Synchronizing Thyristor Power Converter", discloses an improved technique for removing the commutation notches by summing the integrated output of the corrupted line to line voltage with a signal proportional to the commutating inductance multiplied by the fictitious "delta" current which is derived by taking the difference between the actual line currents in a manner well known to those skilled in the art. The resultant or composite voltages are the primary feedback control signals for synchronizing either a fixed frequency source side converter or a variable frequency load side converter or both.

SUMMARY OF THE INVENTION

It is therefore an object of the present invention to provide an improved system for controlling a polyphase power converter.

It is a further object to provide an improved system for controlling commutation of a polyphase power converter.

It is still a further object of the present invention to provide an improved system for controlling the commutation of a load side converter powering a synchronous motor.

It is still another object to provide an improved system for commutating a load commutated inverter for maximizing the torque of an AC motor for a given current.

It is a further object to control a synchronous machine without requiring a position sensor for the machine rotor.

The foregoing and other objects are achieved by a control system primarily for a polyphase load side power converter or inverter utilized to power an AC motor load. The inverter is self commutated above a predetermined motor speed. Control of the commutation of current from one inverter thyristor to another is determined by the amplitude of motor pseudo flux waves which comprises the integral of the line to line voltages between the inverter and the motor load. In the self-commutating mode of operation, a firing strategy is implemented based on the premise that the thyristors should be fired at late as possible while still providing enough time to permit commutation to be completed and yet not sooner than necessary to avoid loss of torque. In the subject invention an optimum firing point is achieved by firing each inverter thyristor prior to the peak of the next pseudo flux wave, which point defines an amount of volt-seconds necessary to effect commutation in view of the load commutating impedance and load current present plus a nominal safety margin. The peak of the forthcoming flux wave is determined from the magnitude of the most recent peak or an average of a selected number of previous consecutive peak values. This determination and firing control is implemented preferably in sofeware, but can, when desirable, be implemented in hardware.

BRIEF DESCRIPTION OF THE DRAWINGS

While the present invention is described in particularly in the claims annexed to and forming a part of this specification, a better understanding of the invention can be had by reference to the following description taken in conjunction with the accompanying drawings in which:

DESCRIPTION OF THE PREFERRED EMBODIMENTS

Figure 1:
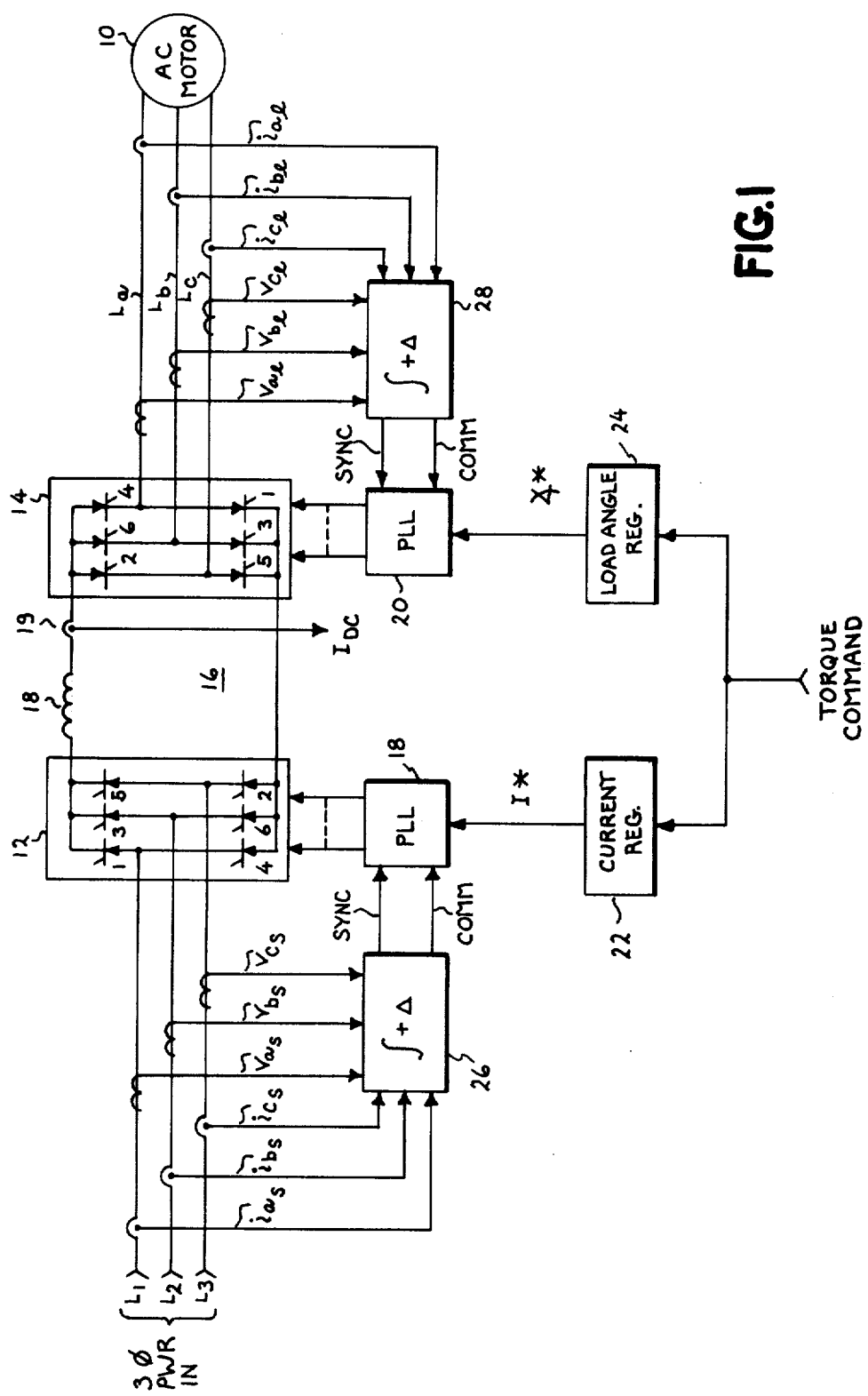
FIG. 1 is a major block diagram illustrative of an AC motor drive system incorporating the present invention.

Considering the overall operation of an AC motor drive system including the invention, reference is now made first to FIG. 1 which illustrates in major block diagram form a system for controlling a load 10, comprising a synchronous motor from a three phase ($3\phi$) power source coupled to line terminals $L_1$, $L_2$, $L_3$ in accordance with the operation of a source side converter 12 and a load side converter 14. The source side converter 12 operates to convert the three phase AC power into a source of variable direct current (DC) which is coupled by way of a DC link circuit 16 including an inductor 18 to the load side converter 14, hereinafter referred to as the inverter, which in turn operates to generates an AC current of variable magnitude and frequency which is supplied to the motor 10 by means of the three phase lines $L_a$, $L_b$ and $L_c$. These basic power components are set forth in greater detail in the aforementioned Bose patent U.S. Pat. No. 4,276,505.

Both the source side converter 12 and the load side inverter 14 are implemented by means of well known phase controlled thyristor bridge circuits, as basically illustrated, whose conductivity is controlled by means of respective phase-lock loop (PLL) firing control circuits 18 and 20. The firing angles of the thristors in the converter 12 are primarily controlled by the output of a current regulator 22 while the firing angles of the thyristors in the inverter 14 are primarily controlled by the output of a load angle regulator 24. A typical example of the manner in which the torque command signal is generated is shown and described in U.S. Pat. No. 4,230,979 entitled, "Controlled Current Inverter and Motor Control System", issued in Paul M. Espelage, et al. on Oct. 28, 1980.

The firing of the thyristors included in the converter 12 and the inverter 14, moreover, is synchronized with respect to the three phase voltages on lines $L_1$, $L_2$ and $L_3$ and $L_a$, $L_b$ and $L_c$ utilizing a waveform comprising the integration of the AC line to line voltage, the zero crossings of which are used to form a synchronizing pulse train having a frequency six times the fundamental frequency. A preferred form of apparatus utilized for implementing the integration of the line to line voltages is designated by the units 26 and 28 and comprises circuitry shown and described in the above cross referenced application, U.S. Ser. No. 300,200 entitled, "Line to Line Voltage Reconstruction For Synchronizing Thyristor Power Converter". Such circuitry operates to reconstruct the line to line voltage waveforms which become corrupted by the commutation notches appearing in the waveforms of the phase voltages during the time each phase current transfers from an outgoing phase to an oncoming phase by the appropriate firing of the individual thyristors. The line to line voltage reconstruction preferred by the subject invention consists of a composite waveform developed by summing at least one integrated line to line voltage containing commutation notches with a signal corresponding to at least one "delta" current which is derived from the difference of two phase currents and multiplied by a factor representative of the commutation inductance.

Figure 2:
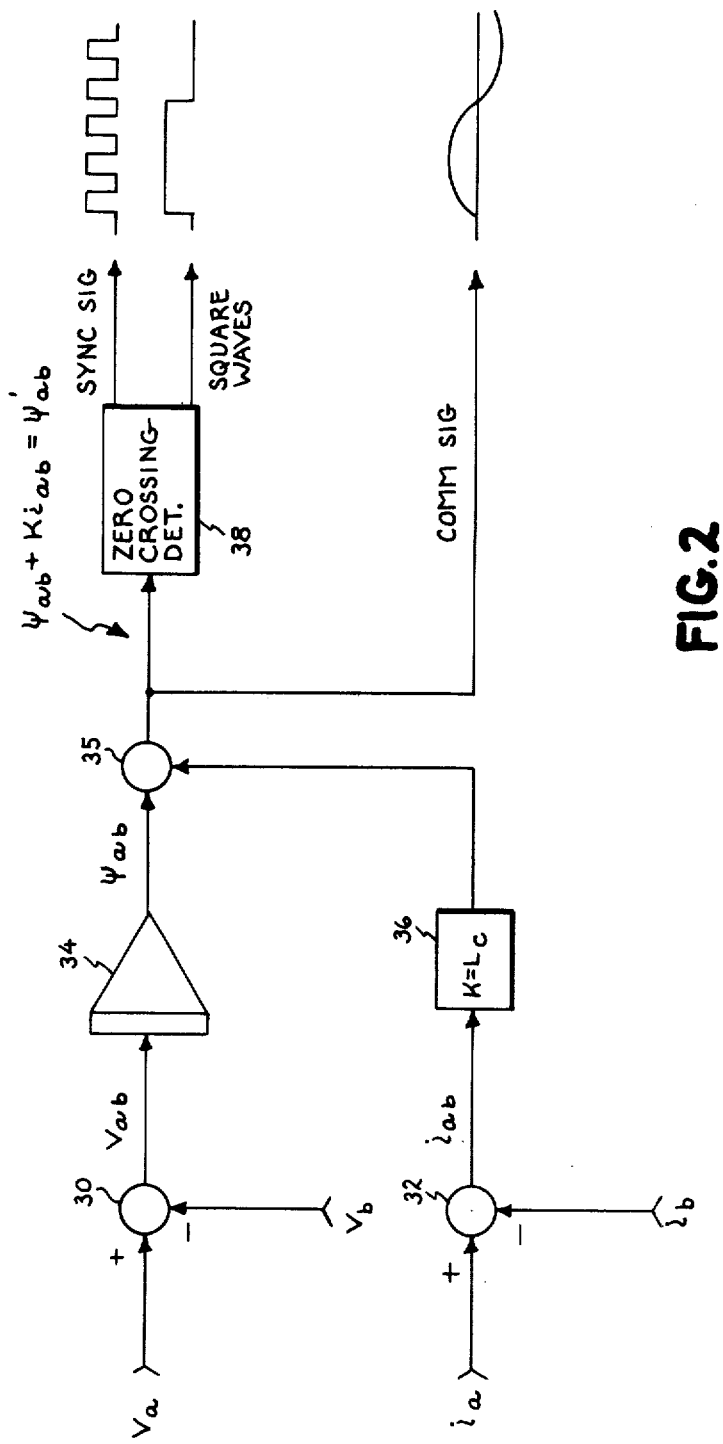
FIG. 2 is a simplified block diagram illustrative of circuitry for generating one of six integrated line to line voltages used for commutation of the inverter powering the AC motor shown in FIG. 1.

Referring now to FIG. 2, there is shown in its simplest form, the manner in which one of the above mentioned reconstructed waves is generated. There, $v_a$ and $v_b$ represent two of the three phase voltages $v_a$, $v_b$ and $v_c$ which are referenced to neutral while $i_a$ and $i_b$ represent the two line currents for the phases a and b. A line to line voltage $v_{ab}$ is developed by differencing the phase voltages $v_a$ and $v_b$ at a summing junction 30 while a "delta" current $i_{ab}$ is developed by differencing the line currents $i_a$ and $i_b$ in a summing junction 32. The line to line voltage $v_{ab}$ is fed to a signal integrator 34 whose output corresponds to a pseudo flux wave $\psi_{ab}$. This flux wave is applied to a summing junction 35 along with a signal $Ki_{ab}$ which corresponds to the delta current $i_{ab}$ which has been appropriately scaled by the commutation inductance $L_c$. The output of the summing junction 35 comprises the waveform $\psi'_{ab} = \psi_{ab} + Ki_{ab}$ and consists of a generally sinusoidal waveform having well defined zero crossings notwithstanding the occurrence of commutation notches in the phase voltages $v_a$, $v_b$ and $v_c$. By connecting a zero crossing detector circuit 38 to the summing junction 35, one of a set of synchronizing signals can be generated for operating either of the phase lock loops 18 and 20 (FIG. 1) which are preferably of the digital type, typical examples of which are shown and described in the above referenced U.S. Pat.

No. 4,263,557 "Power Converter Control", by W. B. Jarvinen, as well as in U.S. Pat. No. 4,090,116, "Closed Loop Digital Control System and Method for Motor Control" by D. L. Lippitt, issued May 16, 1978, and U.S. Pat. No. 4,201,936, "Motor Speed Regulator and Control System" by P. J. Roumanis, issued May 6, 1980.

Figure 3:
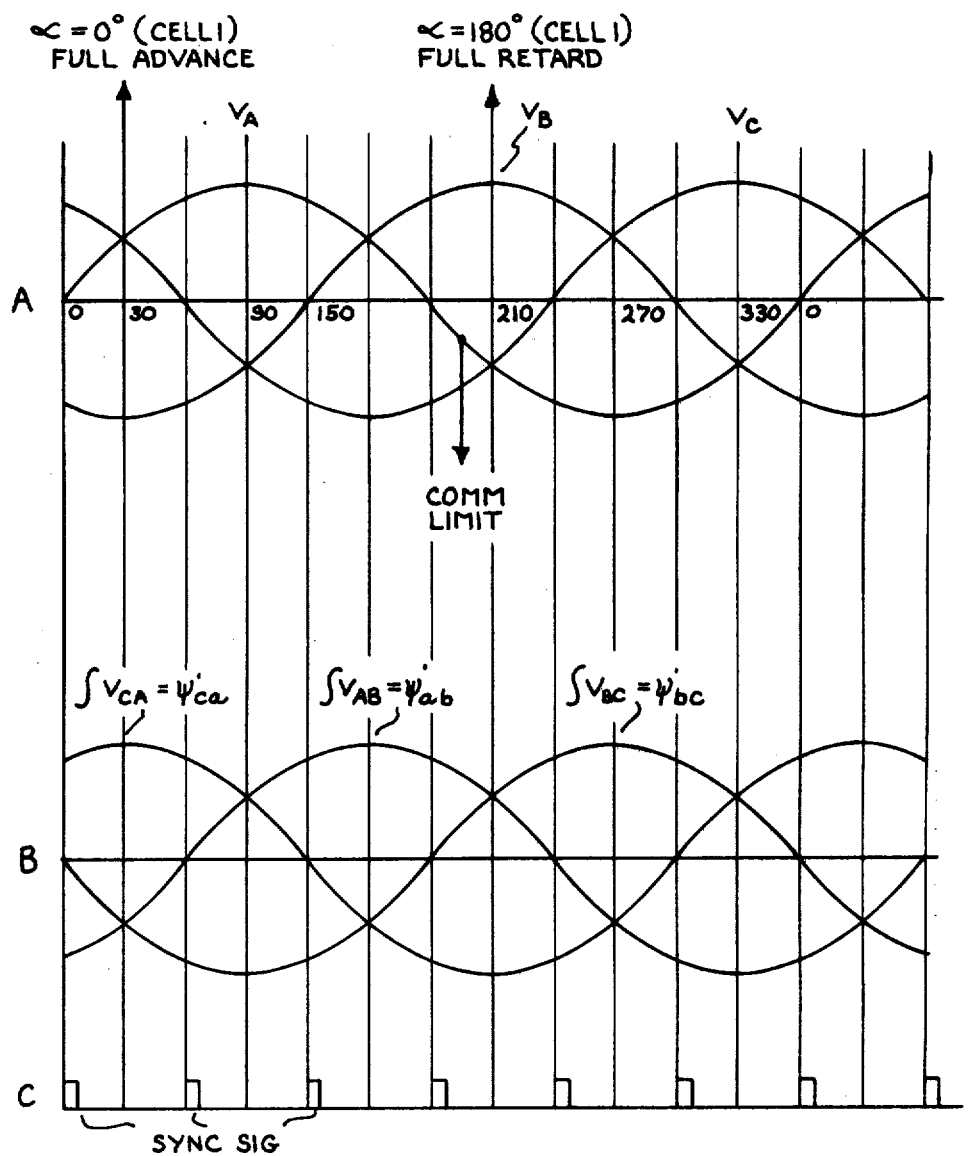
FIG. 3 is a set of time related waveforms helpful in understanding the operation of the subject invention.
Figure 5:
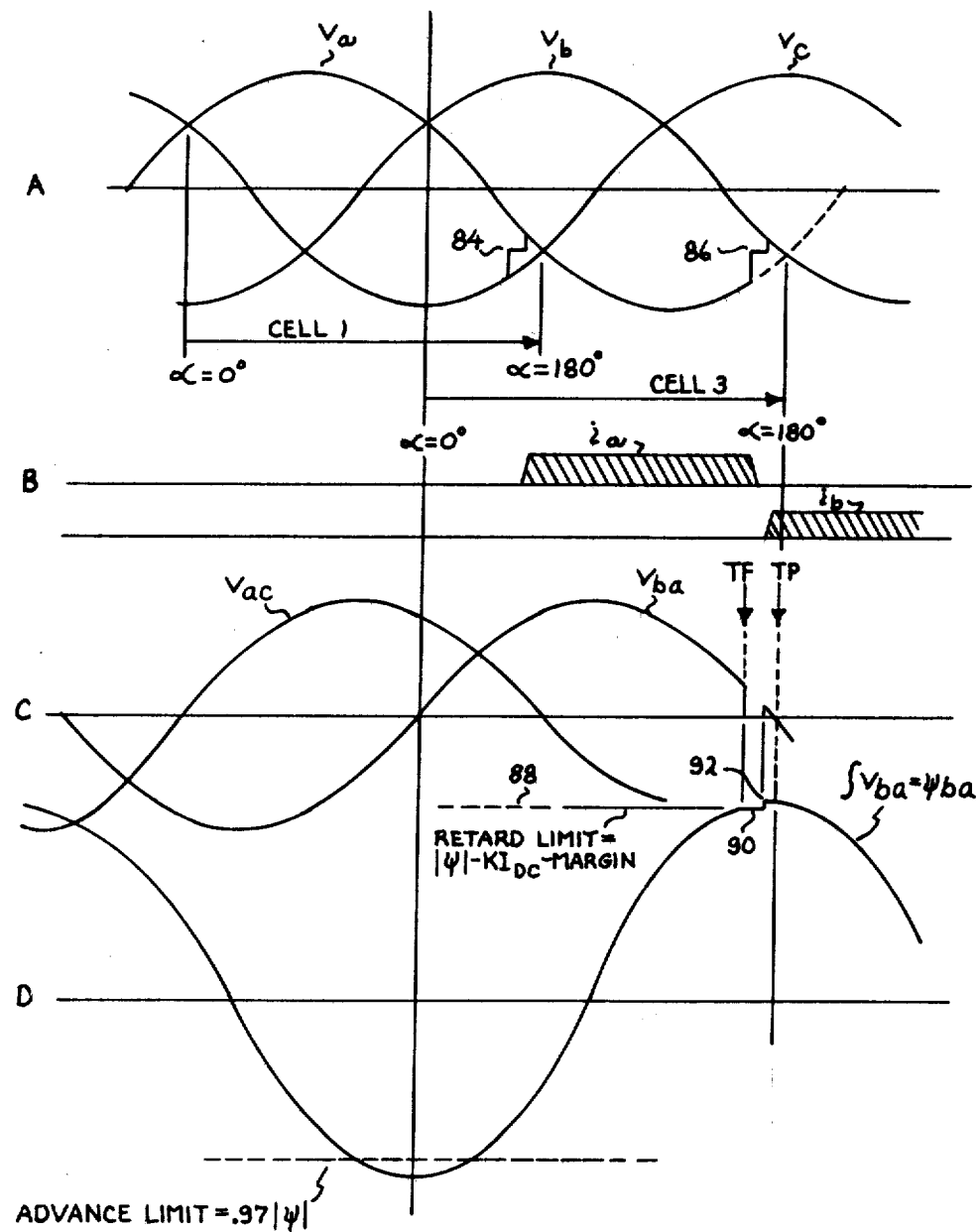
FIG. 5 is a set of time related waveforms illustrative of the commutation provided by the subject invention.

Referring now to FIGS. 3 and 5, in a load commutated inverter system the motor load 10 is normally operating as a motor as opposed to a generator and the load side converter 14 is operating in the inverting mode, hence the name inverter. Under such conditions, the inverter thyristors are fired between the angles $\alpha = 90°$ and $\alpha = 180°$ where $\alpha = 0$ is defined with respect to one thyristor in FIGS. 3 and 5 by the crossings of the line to neutral voltages $v_a$ and $v_c$. If the inverter firing occurs at $\alpha = 180°$, the motor 10 would be operating at unity or slightly lagging power factor; however, in a self-commutation mode, the inverter is operated at a leading power factor to provide the leading KVAR necessary for commutation. In order to obtain maximum torque for a given motor current, however, and still provide commutation capability, it becomes desirable to minimize the leading KVAR to that just sufficient to insure reliable commutation. Typically, the firing angle of the inverter 14 is in the region of $\alpha = 150°$ to 160° to insure that the commutation is completed prior to the subsequent intersection of the waveforms $v_a$ and $v_c$ but preferably about 15° prior to this intersection to provide adequate commutation margin. Having noted that synchronization of both the load side converter 12 and the source side inverter 14 can be effected by use of integrated line to line source and load voltages, after modification by the voltage reconstruction units 26 and 28 shown in FIG. 1, these units provide pseudo flux output waveforms $\psi'_{ab}$, $\psi'_{bc}$ and $\psi'_{ca}$ which are shown by the waveform set B of FIG. 3. While these waveforms are in timed relationship with the waveform set A, it should be noted that the respective crossover points of the line to neutral voltages $v_a$, $v_b$ and $v_c$ intersect at a time where either a positive or negative flux wave peak occurs and wherein $\alpha = 180°$ for a particular thyristor cell of six cell firing group arranged in a bridge circuit, not shown. It is also significant to note that the flux waves $\psi'_{ab}$, $\psi'_{bc}$ and $\psi'_{ca}$ are defined in units of volt-seconds, which units correspond to those required to commutate a current through an inductance as determined by the equation:

$$E_1 = L(di/dt) \qquad (1)$$

from which there is obtained the expression:

$$E\Delta t = L\Delta i \qquad (2)$$

wherein E is the source voltage, $\Delta t$ is the commutation time, L is the commutation inductance and $\Delta i$ is the current being commutated.

The present invention is directed to means for particularly determining the appropriate firing angle for the thyristors of the inverter 14 during self commutation from the peak value of the respective previous flux wave. Then by knowing the motor current and commutating impedance, the necessary volt-seconds necessary for commutation are determined and subtracted from this peak value after which, when the actual plus or minus amplitude of appropriate flux wave reaches this amplitude, the next cell firing is initiated. Alternatively, an average of a selected number of consecutive peak values of flux waves are determined from which the necessary volt-seconds are subtracted to determine the appropriate point for the next cell firing.

Figure 4:
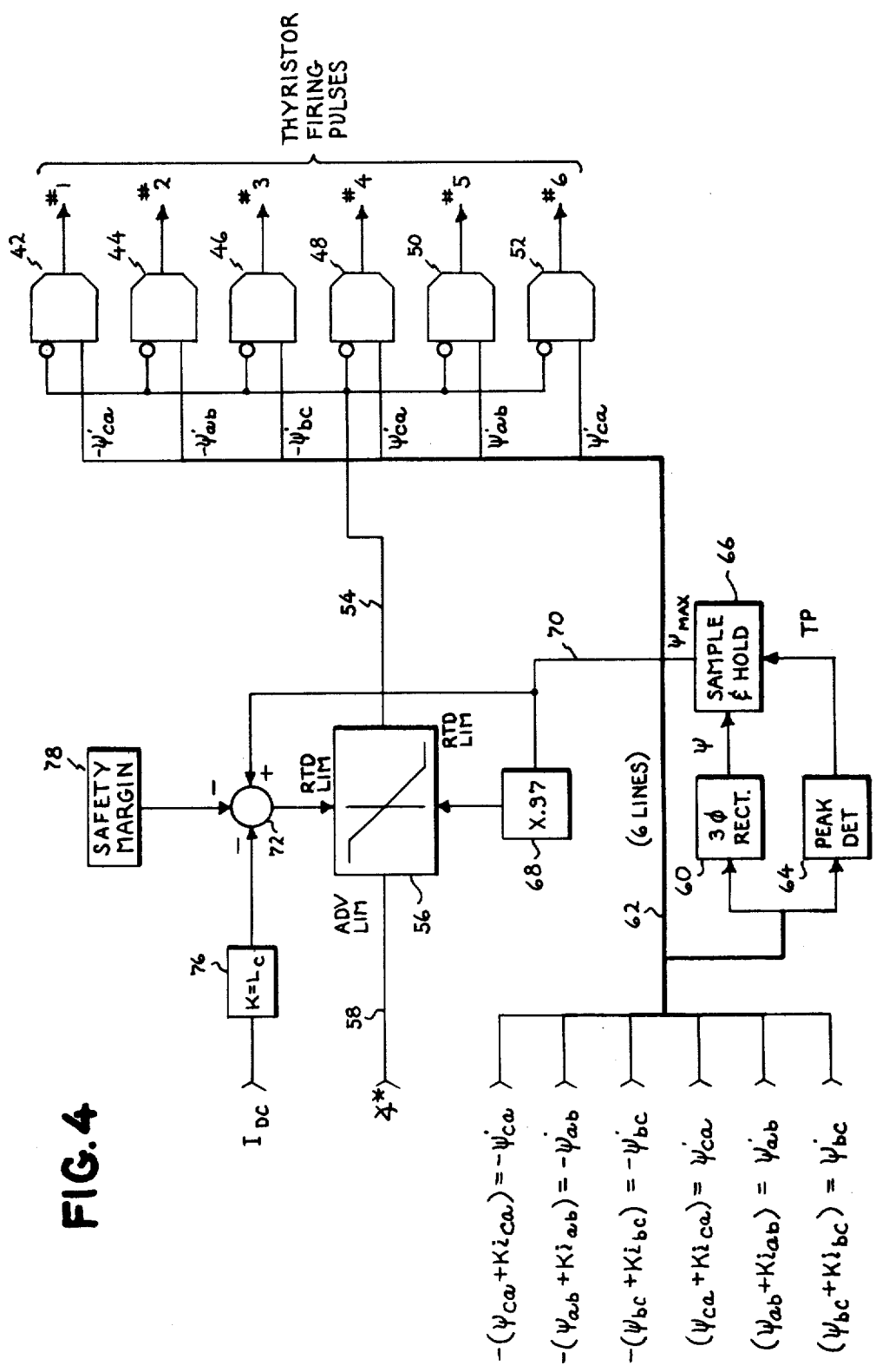
FIG. 4 is an electrical block diagram illustrative of an analog embodiment of the subject invention.

Referring now to FIG. 4, there is disclosed an analog embodiment of a circuit for implementing this type of commutation control. As shown, six pseudo flux waves $-\psi'_{ca}$, $-\psi'_{ab}$ ... $\psi'_{ab}$ and $\psi'_{bc}$ which are derived from circuits as shown in FIG. 2 are respectively fed to the non-inverting inputs of six signal comparators 42, 44, 46, 48, 50 and 52. The comparators have their respective inverted inputs commonly connected to signal line 54 which connects to the output of a clamp or limiter circuit 56 which receives an input signal on signal line 58 and which corresponds to the desired firing angle command signal $\chi^*$ from the load angle regulator 24 as shown in FIG. 1. The maximum output of the limiter circuit 56 provides either a retard limit command or an advance limit command for firing the inverter thyristors by the output of the comparators 42 ... 52. The peak flux wave amplitude $\psi_{max}$ is determined by means of a three phase rectifier 60 coupled to the six lines 62 of the flux waves which is also fed to a peak detector circuit 64. The output of the three phase rectifier 60 is fed to a sample and hold circuit 66 which is triggered by a peak signal TP whereupon the peak flux wave value $\psi_{max}$ is applied to the scaling circuit 68 which provides a multiplication factor of approximately 0.97 to define the advance limit command as being 0.97 times the peak flux wave $\psi_{max}$. The output line 70 of the sample and hold circuit is also coupled to summing junction 72 which has applied thereto a scaled value of the motor current $I_{dc}$ obtained, for example, from the current sensor 19 in the DC link circuit 16 shown in FIG. 1. A scaling circuit 76 is adapted to multiply the line current $I_{dc}$ by a factor K proportional to the commutating inductance $L_c$, which is subtracted from the peak flux signal appearing on line 70 by being applied to a subtracting input $(-)$ of the summing junction 72. In addition, another term proportional to a desired safety margin applied from circuit block 78 is subtracted from the peak flux value $\psi_{max}$ by being applied to a subtracting input $(-)$ of the summing junction 72. The resultant signal output from the summing junction 72 corresponds to a signal $\psi_{max}$-$KI_{dc}$-MARGIN which comprises the retard limit signal for the next cell firing. Accordingly, when the flux wave amplitudes successively exceed the angle command signal from the advance/retard limit circuit 56, the appropriate next thyristor is gated on by means of the comparators 42, 44, 46, etc. while the gate enable is removed from the appropriate previously conducting thyristor.

This operation can be understood with reference to the waveforms of FIG. 5 wherein, for example, the waveform set A is illustrative of the time relationship of the three line to neutral voltages $v_a$, $v_b$ and $v_c$. Also illustrated are two 180° time periods for the firing angles $\alpha$ for cells 1 and 3 with the commutation process of cells 5 to 1 and 1 to 3 being shown by reference numerals 84 and 86. The waveforms of set B are indicative of the thyristor currents in thyristors 1 and 3. The waveform of set C of FIG. 5 is illustrative of the two line to line voltages $v_{ac}$ and $v_{ba}$ while the single waveform D is illustrative of the integrated waveform of $v_{ba}$ which corresponds to the flux wave $\psi_{ba}$. It can be seen that waveform D lags the waveform $v_{ba}$ by 90° and accordingly the peak of the waveform D which corresponds to the time TP occurs at the crossover of the line to neutral voltages $v_b$ and $v_c$. The amplitude as indicated by reference numeral 88 of waveform D of FIG. 5 illustrates the retard firing limit which is comprised of the $KI_{dc}$ term 90 and the margin 92. Thus in normal operation, the firing angle command is at the retard limit except in instances where motor deceleration is occurring or when the inverter 14 is being phased forward for some other control purpose.

Figure 6:
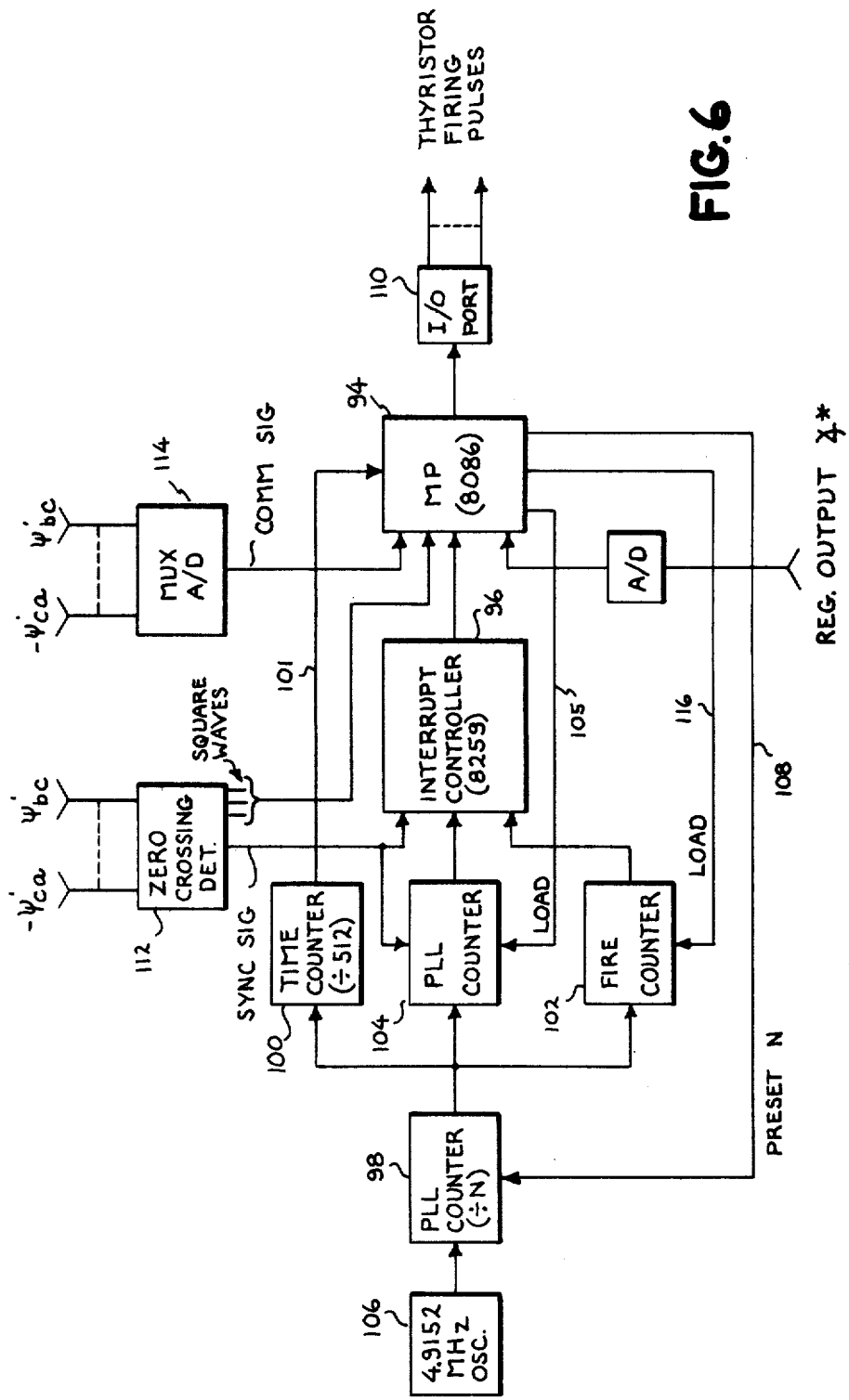
FIG. 6 is an electrical block diagram illustrative of a digital embodiment of the subject invention.

While the circuitry shown in FIG. 4 discloses an implementation of the subject invention in analog form, FIG. 6 discloses a digital implementation thereof which includes an Intel 8086 microprocessor 94 programmed in PLM 86 language having self contained interrupt programs under the control of an Intel 8259 interrupt controller 96. The controller 96 generates interrupts in a well known fashion which causes the microprocessor 94 to execute some task or calculation and typically store the time to execute some future event into a downcounter. When the down counting reaches zero, the counters generate another interrupt which initiates the event, after which the counter is reloaded for the time to execute the next event.

With respect to FIG. 6 a software phase locked loop configuration is shown wherein four counters are utilized, namely a phase lock loop counter 98, a time counter 100, a fire counter 102 and the pulse train limit counter 104. In operation, a variable frequency source is created by the phase lock loop counter 98 by dividing a 4.9152 MHz output pulse train from a clock oscillator 106 by a value N set by a signal "PRESET N" from the microprocessor 94 on a data bus 108. The output of the counter 98 is adapted to be maintained at a frequency 512 times the frequency of the individual flux waves $-\psi'_{ca} \ldots \psi'_{bc}$ in the following manner. The time counter 100 is initially set to 512 and decremented by one each clock pulse from counter 98. When counter 100 is decremented to zero it resets to 512. Thus counter 100 gives a measure of phase angle relative to the flux waveforms. The count value in the time counter 100 is fed to the microprocessor 94 via data bus 101 where it is used for phase reference for firing the inverter cells, not shown, through a digital I/O port 110. Synchronization is first achieved by passing the pseudo flux waveforms $-\psi'_{ca} \ldots \psi'_{bc}$ through a zero crossing detector circuit 112 which generates a synchronizing pulse every time a flux wave passes through zero. These pulses are fed to the interrupt controller 96 on signal line 97 which interrupts the microprocessor 94 and initiates a crossover service program. The zero crossing detector 112 also generates a three bit number indicating the relative signs of the motor flux waveforms, which number is fed to and read by the microprocessor 94 and is used to identify which zero crossing has caused the interrupt pulse. The zero crossover service program reads the value in the time counter 100 and compares it to the correct value for the particular flux wave crossing to generate a phase error between the counter 100 and the flux waves. This error is used to calculate a new "PRESET N" value which is then loaded into the phase lock loop counter 98.

As shown by the waveforms A and B of FIG. 3, the peak values of the flux waveforms $\psi'_{ca}, \psi'_{ab}$ and $\psi'_{bc}$ occur at an interval of 30° following zero crossings of the line to neutral phase voltages $v_a$, $v_b$ and $v_c$. The zero crossover interrupt also initiates the countdown of the pulse train limit counter 104 which had been set with 30° of count. When counter 104 decrements to zero, it causes an interrupt to occur which is at the time the next flux wave peak $\psi_{max}$ value occurs. Thus the pulse train limit interrupt program reads the peak value of the appropriate flux wave appearing at the output of a multiplexed analog to digital converter 114 whose input is coupled to three flux waves $-\psi'_{ca} \ldots \psi'_{bc}$.

The timing of the firing of each thyristor cell in the inverter 14 is accomplished by means of the fire counter 102. After a cell firing, the microprocessor 94 computes the time to fire the next cell. This time is compared to the value in the time counter 100 which corresponds to current time. The difference to "time to go" is then loaded into the fire counter 102 via the data bus 116, which then decrements to zero causing a yet another interrupt through the interrupt controller 96 which initiates a cell firing program.

Figure 7A:
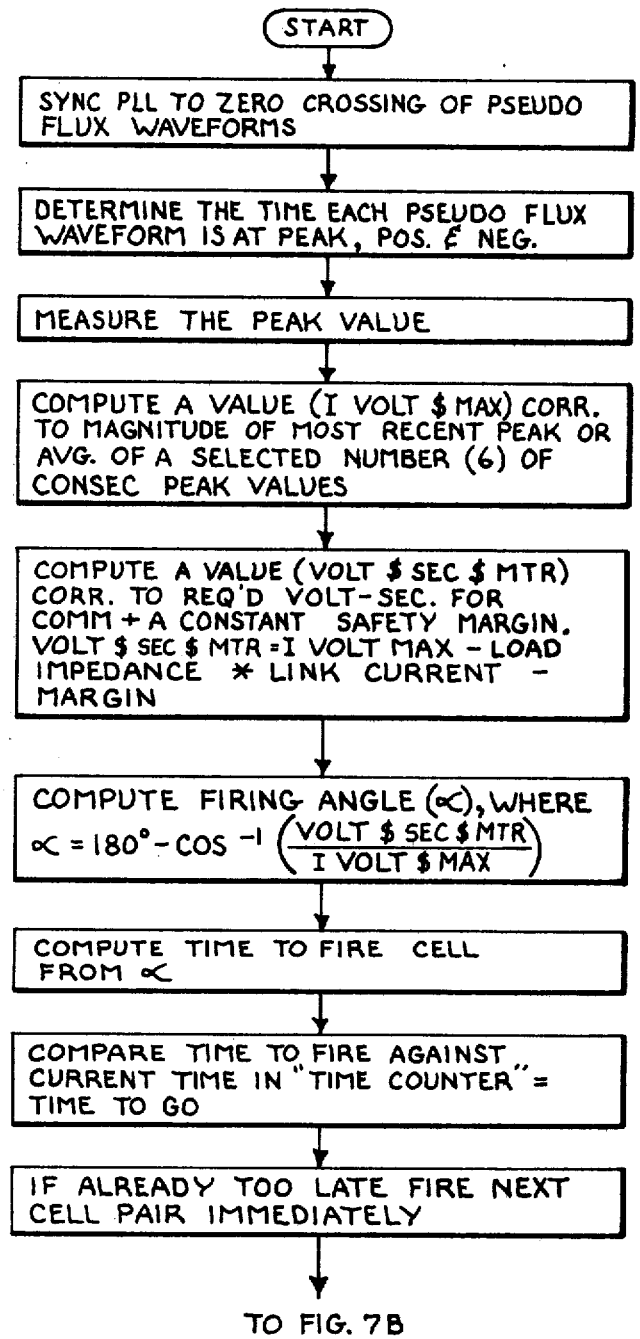
FIGS. 7A and 7B comprise a flow chart illustrative of the software for implementing commutation of a load commutated inverter with the embodiment shown in FIG. 6.
Figure 7B:
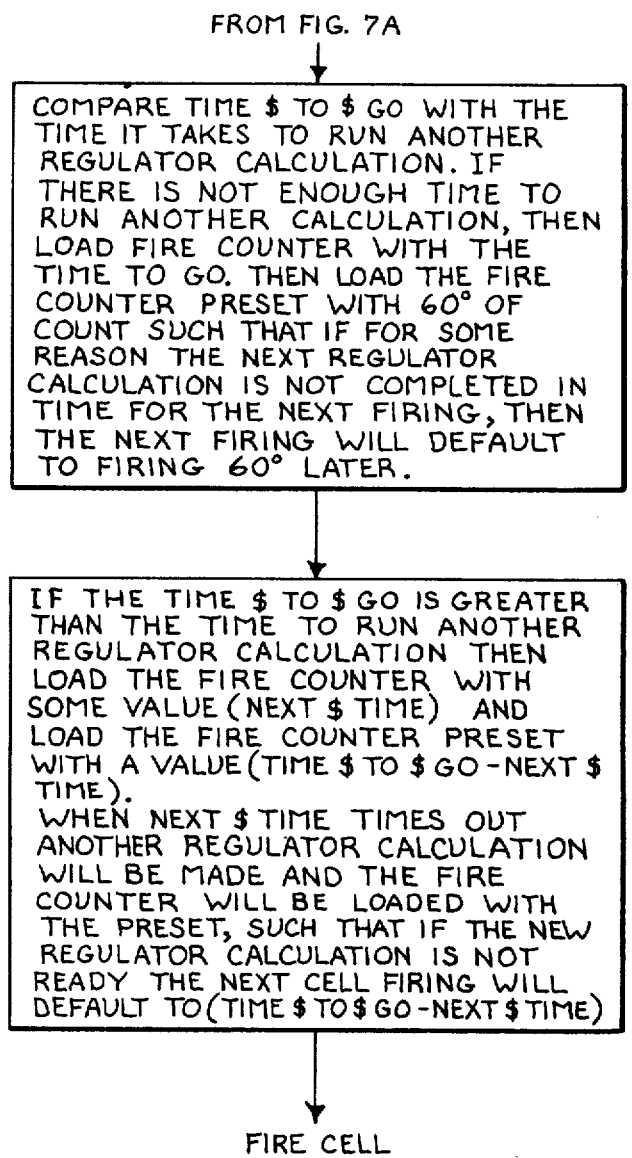

The software required for the embodiment illustrated in FIG. 6 is represented by the flow chart shown in FIG. 7. As shown, the routine for effecting commutation in accordance with the invention begins by synchronizing the phase lock loop to the zero crossings of the pseudo flux waveforms. Next the software determines the time each pseudo flux waveform is at a peak value, both positive and negative, followed by a measurement of that particular peak value. Next a computation is made of the value IVOLT$MAX which corresponds to the magnitude of the most recent peak or alternatively an average value of a selected number, for example the last six consecutive peak values. Following this, a value VOLT$SEC$MTR is computed where VOLT$SEC$MTR=IVOLT$ MAX-LOAD IMPEDANCE*LINK CURRENT-MARGIN. Once the VOLT$SEC$MTR has been computed, a firing angle α is computed according to the expression $$\alpha = 180° - \cos^{-1}\left(\frac{\text{VOLT\$SEC\$MTR}}{\text{IVOLT\$MAX}}\right).$$

Following this computation, a "time to fire" a particular cell is computed from the firing angle α whereupon the time is compared against the current time in the time counter 100, which time corresponds to the "time to go" (TGO). If the "time to go" is negative, this means that it is already too late to fire and the next thyristor pair is fired immediately. If the "time to go" is too short to allow another regulator calculation, the fire counter is loaded with the "time to go" and the fire counter preset is loaded with the equivalent of 60° of count. By this means the next thyristor pair is fired after the "time to go" count is decremented in the fire counter and then the 60° of count is loaded into the fire counter such that if the next regulator calculation is not completed within 60° the time for firing the next thyristor pair defaults to 60° after the last firing.

If the "time to go" calculated above is long enough to run a another regulator calculation, then the fire counter is loaded with some count, "next time", and the fire counter preset is loaded with "time to go-next time". By this means after" next time "decrements to zero another regulator calculation is made to determine a new "time to go". If however this new calculation is not ready the time for firing the next thyrister pair defaults to "time to go-next time".

In order to more fully understand the operation of the microprocessor 94 as it relates to control of the load side inverter 14, the interrupt programs for this microprocessor will be briefly considered. Although some redundancy will result in view of the preceding description, in their descending order of priority, the programs consist of: (1) the fire counter service program, (2) the crossover service program, (3) the pulse train limit service program, (4) the phase lock loop correction program, and (5) the inverter control program.

The fire counter service interrupt program is initiated every time the fire counter 102 times out. The fire counter service interrupt program also checks to see if the inverter is in a self commutation mode. If it is, it sets up the next fire counter load output from the microprocessor for a count of 60° so that barring later information, the next fire counter service interrupt will occur at 60°. The fire counter service interrupt program then checks to see if a new cell firing is to occur during this pass through the program; if so, the cell firing algorithm is called. Then the fire counter service interrupt generates an interrupt to initiate the inverter control interrupt program which is of the lowest lvel of priority.

The second highest priority interrupt program is the crossover interrupt which as previously noted is generated at every zero crossing of the reconstructed flux waves that occur six times per cycle of fundamental frequency and from which are generated the synchronizing signals for the software phase lock loop shown in FIG. 6. The crossover interrupt program, moreover, reads the time counter 100 which is clocked from the phase lock loop counter 98. As already indicated, the clock rate is 512 pulses for fundamental frequency. Thus the fundamental frequency period is divided by 512 giving the time counter an angle resolution of 360° divided by 512, which is equal to 0.703°. The crossover program also reads the pulse train limit counter which started counting down from a count equivalent to 30° when the zero crossing interrupt was generated. This enables a correction of the time counter reading by the amount of time that the higher priority fire service interrupt program may have held off the crossover interrupt program. The crossover program then generates an interrupt calling for the phase lock loop correction interrupt program. The phase lock loop correction program next determines the angular error between the synchronizing crossover interrupt pulses outputted from the zero crossing detector 112 and the actual corrected time counter reading from counter 100 whereupon a new ÷N is loaded into the PLL counter 98 and which operates to nullify this error.

Next the pulse train limit service program, which is third in priority, occurs when the pulse train limit counter 104 decrements to zero. This occurs twice per 60° of fundamental frequency. A first pulse train limit interrupt occurs 30° of fundamental frequency after a flux wave zero crossing. After this interrupt, the pulse train limit interrupt program reloads the pulse train limit counter 104 with 15° of count and starts the pulse train limit counter 104 decrementing. On reaching a zero count, a second pulse train limit interrupt occurs. In accordance with this second pulse train limit interrupt, the pulse train limit counter is reloaded with 30° of fundamental frequency count, but the counter doesn't initiate countdown until the occurrence of the next flux wave zero crossover. The second pulse train limit interrupt which occurs 15° after the first is used to check commutation failure and if so, to initiate an algorithm to recover from this commutation The fourth highest priority interrupt program is the phase lock loop correction interrupt program and is called once for each crossover interrupt program. The phase lock loop correction interrupt program calculates the value of the divider (÷N) for the PLL counter 98 to maintain synchronism between the pulse output of the counter and the zero crossings of the flux waves.

The load side inverter control interrupt program is the lowest is priority but contains the bulk of the mode determination, regulator, thyristor firing angle determination functions and accordingly calls the appropriate algorithm. While the inverter control interrupt program is lowest in priority, it is called by the highest priority fire service interrupt program.

Accordingly, the present invention discloses a technique whereby the optimum time to fire the inverter cells in a self commutating adjustable speed synchronous motor drive is determined in a simple but elegant manner by the motor's own back emf from which the pseudo flux waveforms are derived.

While there has been shown and described what are at present considered to be the preferred embodiments of the invention, modifications thereto will readily occur to those skilled in the art. It is not desired, therefore, that the invention be limited to the specific methods and logic structure shown and described, but it is intended to cover all such modifications, changes and alterations as fall within the true spirit and scope of the invention as defined in the appended claims.

We claim:

1. A method of generating a firing control signal for controlling current commutation of a set of thyristors included in an electrical power converter coupled to a polyphase AC power line, comprising the steps of:
   (a) deriving at least one voltage signal representing the line-to-line voltage on said AC power line;
   (b) generating a pseudo flux signal waveform from said voltage signal;
   (c) determining the peak value of at least one pseudo flux signal waveform;
   (d) determining a value, in terms of the units of the pseudo flux signal waveform, necessary to effect thyristor current commutation in said thyristors;
   (e) determining a difference value between said peak value and said value necessary to effect commutation;
   (f) determining a thyristor firing angle from said difference value and generating said firing control signal therefrom; and
   (g) applying said firing control signal to firing circuitry for selectively firing at least one of the thyristors prior to the peak of the forthcoming pseudo flux signal waveform.

2. The method of claim 1 wherein said step (d) comprises determining a value in terms of volt-seconds necessary to effect commutation plus a predetermined safety margin.

3. The method of claim 2 wherein said volt-seconds necessary for commutation is derived from a value of commutation impedance and current being commutated.

4. The method as defined by claim 3 wherein said step (c) of determining the peak value comprises determining the peak value of the most recent pseudo flux waveform.

5. The method of claim 3 wherein said step (c) of determining the peak value comprises an average of a selected number of previous peak values.

6. The method of claim 5 wherein said step (c) comprises determining the average of at least six previous consecutive peak values.

7. The method of claim 1 and additionally including step (h) of initially synchronizing the firing of said set of thyristors to the zero crossing of said pseudo flux waveform.

8. The method of claim 1 wherein said step (b) of generating said pseudo flux signal waveform comprises integrating said line-to-line voltage signal.

9. The method of claim 8 wherein said step (b) of generating said pseudo flux waveform comprises integrating said line-to-line voltage signal and thereafter substantially eliminating any commutation notches therein.

10. The method of claim 1 wherein said power converter comprises a DC converter coupled to an AC load via said power line.

11. The method of claim 1 wherein said power converter comprises at least one of two interlinked power converters for driving an AC motor load.

12. The method of claim 1 wherein said power converter comprises a load commutated inverter supplying a synchronous machine such as an AC motor.

13. The method of claim 1 wherein said power converter comprises a polyphase load side converter or inverter which operates to supply AC power of variable frequency to a polyphase synchronous motor.

14. The method of claim 1 wherein said power converter comprises a 3ϕ load side converter or inverter which operates to supply AC power of variable frequency to a 3ϕ synchronous motor.

15. The method of claim 1 wherein said step of deriving the line-to-line voltage on said AC power line comprises a step of sensing at least two phase voltages of said polyphase AC source and thereafter differencing said phase voltages to provide said line-to-line voltage signal.

16. The method of claim 14 wherein said phase voltages correspond to the phase to neutral voltages of said AC power line.

17. A method of generating firing control signals for controlling current commutation of a set of thyristors included in a 3ϕ inverter supplying power to a 3ϕ synchronous motor, comprising the steps of:
 (a) deriving the three voltage signals representing the line-to-line voltages on a 3ϕ AC power line coupled to said motor from said inverter;
 (b) generating pseudo flux signal waveforms from said three voltage signals;
 (c) determining the peak value of at least one of said pseudo flux signal waveforms;
 (d) determining a value, in terms of the units of said pseudo flux signal waveform, necessary to effect thyristor current commutation in said thyristors;
 (e) determining a difference value between said peak value and said value necessary to effect commutation;
 (f) determining thyristor firing angles from said difference value and generating said firing control signals therefrom; and
 (g) applying said firing control signals to firing circuitry for sequentially firing each of the thyristors prior to the peak of the respective forthcoming pseudo flux signal waveforms.

18. Apparatus for generating a signal adapted to commutate the current of thyristors selectively fired in a power converter having a commutation inductance associated therewith and coupled to a polyphase AC power line comprising in combination:
 (a) means providing at least one signal representing the line-to-line voltage on said power line;
 (b) means for integrating said at least one signal representing the line-to-line voltage on said power line to provide a pseudo flux wave signal;
 (c) means for determining the peak value of at least one pseudo flux wave signal;
 (d) means for determining a value in terms of the units of the pseudo flux wave signal necessary to effect thyristor current commutation of said thyristors;
 (e) means for determining a difference value between said peak value and said value necessary to effect commutation;
 (f) means for determining the firing angle for at least one of said thyristors from said difference value and generating a firing control signal therefrom;
 (g) firing control circuit means for selectively firing said thyristors prior to the peak of the forthcoming pseudo flux wave signal; and
 (h) circuit means for applying said firing control signal to said firing control circuit means.

19. The apparatus as defined by claim 18 wherein said firing control circuit means (g) comprises a phase lock loop for controlling the firing of said thyristors in said power converter.

20. The apparatus as defined by claim 18 wherein said means (c) for determining the peak value comprises means for determining the peak value of the most recent pseudo flux wave signal.

21. The apparatus as defined by claim 18 wherein said means (c) for determining the peak value comprises means for determining the average of a predetermined number of previous peak values.

22. The apparatus as defined by claim 18 wherein said means (c) for determining the peak value comprises means for determining the average peak value of at least six consecutive previous peak values.

23. The apparatus as defined by claim 18 wherein said means (d) comprises means for determining the volt-seconds necessary to effect current commutation plus a predetermined safety margin.

24. The apparatus as defined by claim 18 wherein said power converter comprises at least one converter of a polyphase AC power supply system including a source side phase controlled thyristor bridge converter and a load side phase controlled thyristor bridge inverter coupled together by means of a DC link circuit and operable to supply a load with AC current of variable magnitude and frequency.

25. The apparatus as defined by claim 24 wherein said power converter comprises a polyphase load commutated converter or inverter and said load comprises a polyphase synchronous motor, and whereby said inverter operates to supply AC power of variable frequency to said motor.

26. The apparatus as defined by claim 25 wherein said means for providing at least one signal representing the line-to-line voltage comprises means for sensing the back EMF voltages of said synchronous motor in response to phase currents fed to said motor from said inverter via a polyphase power line.

27. The apparatus as defined by claim 26 wherein said polyphase power line comprises a 3ϕ line and wherein said means (b) for integrating said at least one signal representing the line-to-line voltage comprises means for integrating each of the line-to-line voltages on said three phase line, and wherein said firing control circuit means (g) comprises means for sequentially firing said thyristor bridge inverter prior to the peaks of the forthcoming pseudo flux wave signals provided by the integrated line-to-line voltages.

28. The apparatus as defined by claim 24 wherein said means for determining the volt-seconds necessary to effect current commutation includes means for sensing motor current and means for scaling said motor current by a value corresponding to the commutating inductance.

29. The apparatus as defined by claim 18 wherein said means (c) through (g) are implemented by microprocessor means.

30. The apparatus as defined by claim 18 and additionally including means for synchronizing the firing of said thyristors to the respective zero crossovers of pseudo flux wave signals.

* * * * *